March 13, 1928.  1,662,394
A. NYLUND
ANIMAL TRAP
Filed May 14, 1927  2 Sheets-Sheet 1
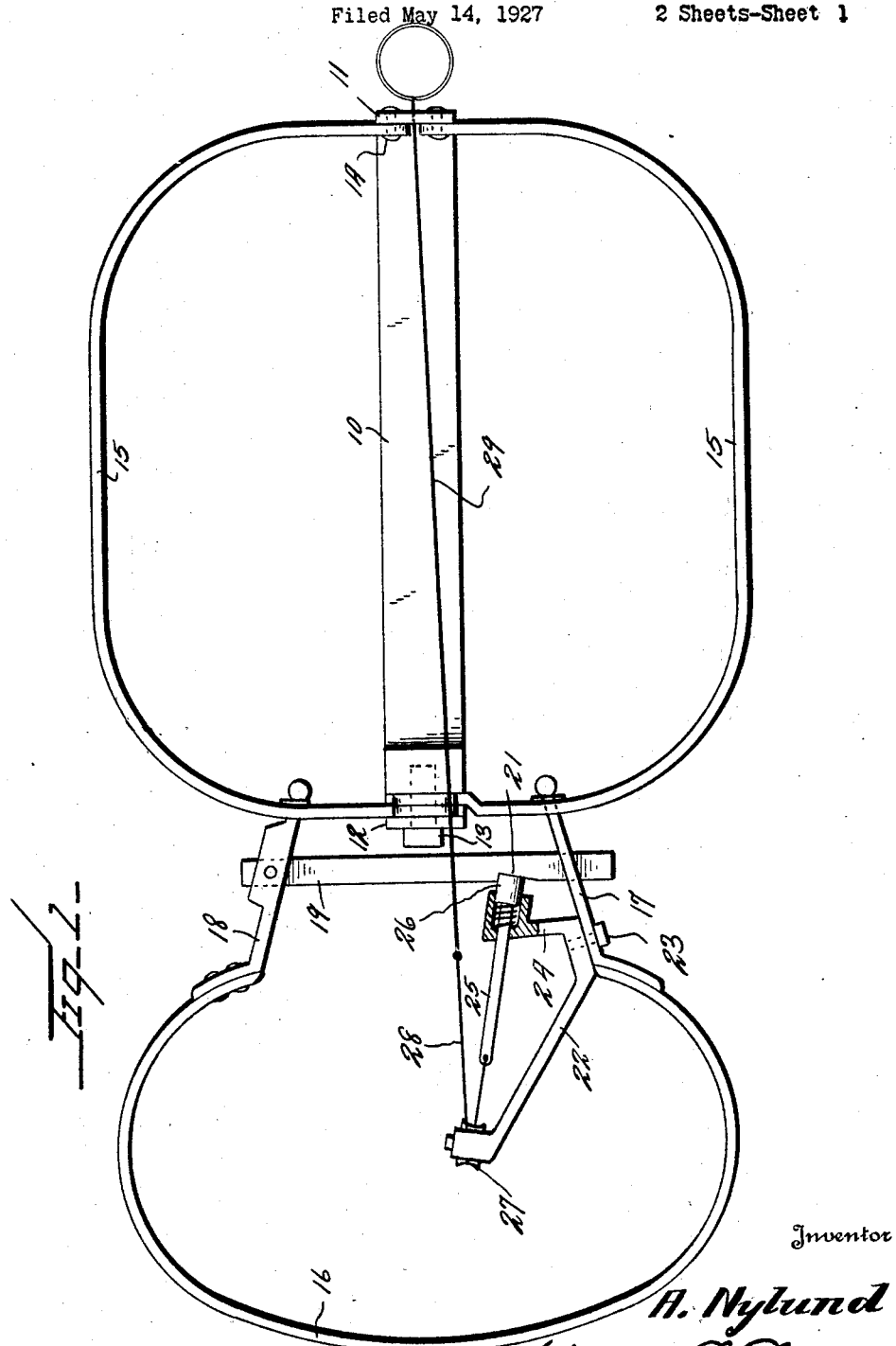
Inventor
A. Nylund
By Watson E. Coleman
Attorney

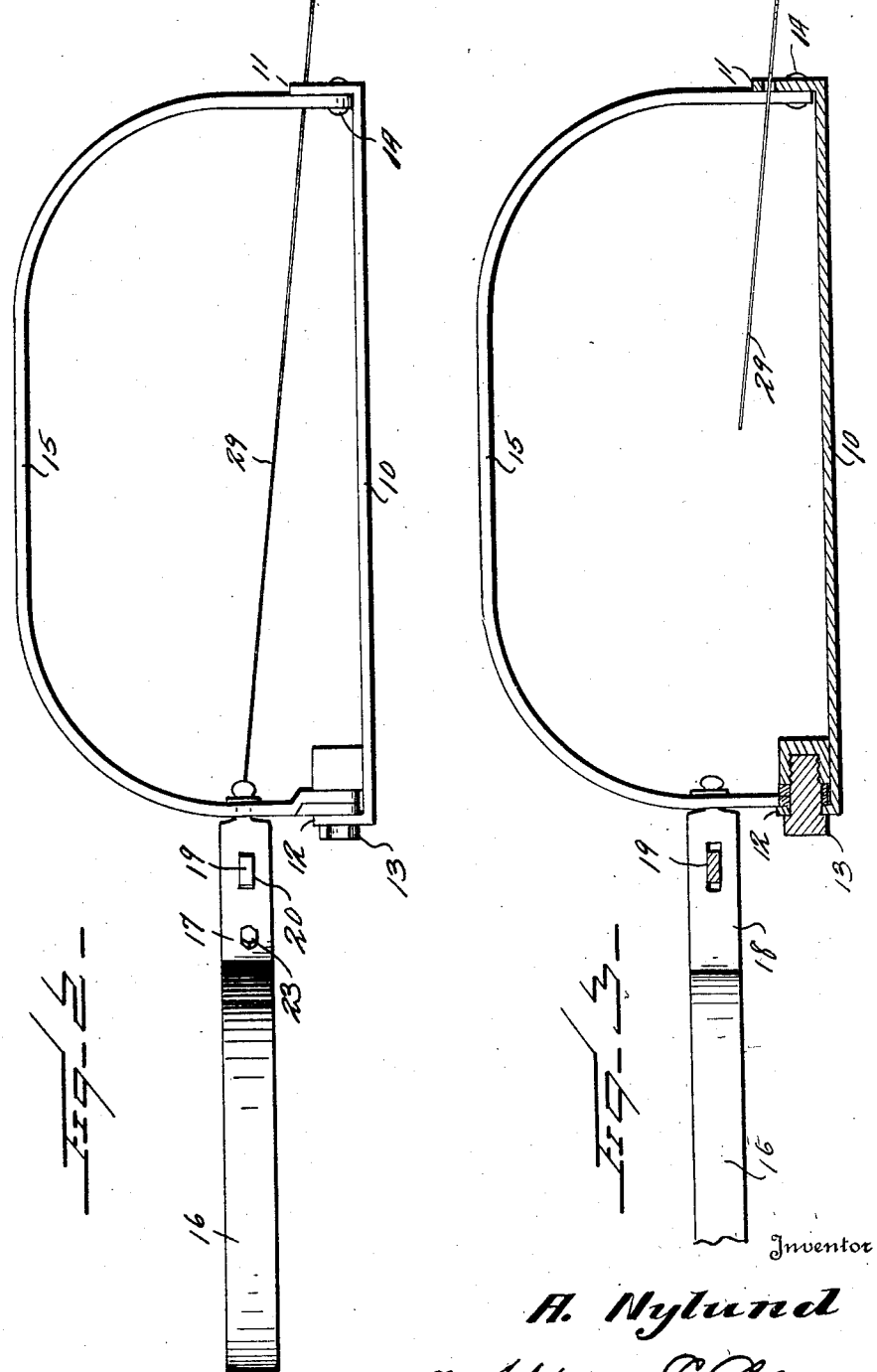

Patented Mar. 13, 1928.

1,662,394

UNITED STATES PATENT OFFICE.

ANDRO NYLUND, OF ALAMEDA, CALIFORNIA.

ANIMAL TRAP.

Application filed May 14, 1927. Serial No. 191,441.

This invention relates to animal traps and particularly to traps having opposed jaws and a spring normally acting to close said jaws, and trigger operated means for holding the jaws open.

The general object of this invention is to provide a trap of this character which is very simple, which is thoroughly effective, and in which the trigger is operated by means of a cord or wire upon which the bait is carried, thus doing away with the foot pressed trigger.

A further object is to provide an improved form of spring for a trap of this character and improved means whereby the spring may engage the jaws to urge them to a closed position.

My invention is illustrated in the accompanying drawings, wherein:—

Figure 1 is a top plan view of my improved trap with the jaws opened;

Figure 2 is a side elevation with the jaws closed;

Figure 3 is a fragmentary longitudinal section with the jaws closed.

Referring to these drawings, 10 designates a longitudinally extending strip of metal constituting the base of the trap and upwardly turned at 11 and 12. Passing through the upwardly turned end 12 is a screw or bolt 13. Passing through the end 11 are two rivets 14. Pivotally mounted upon the rivets 14 and upon the single screw or bolt 13 are the jaws 15 which are upwardly bowed in the usual manner. When set, these jaws are turned down into a horizontal position and when the trap is sprung, the jaws swing upwardly toward each other to grip the animal's leg or body.

The jaws are urged toward each other by means of a leaf spring 16 which is bent to form a partial ellipse and is attached at its ends to bracket strips 17 and 18 which in turn are riveted to the jaws 15. The bracket 18 is slotted and pivotally mounted upon this bracket is a bronze trigger bar 19 which passes through a slot 20 in the other strip 17. This bar 19 is formed with a ratchet shaped notch 21. Mounted upon the member 17 is a bracket 22 extending inward toward the middle of the spring 16 and this is fastened by a screw 23 to the member 17. This bracket is formed to provide an inner arm 24 within which is mounted the latch 25, the head 26 of this latch engaging the notch 21 in the trigger 19. The other arm of the bracket 22 carries upon it a pulley 27 and passing over this pulley is a cord or wire 28 which is attached to the latch 25 and then is engaged with a wire 29 which passes longitudinally over the base of the trap and through an opening in the upwardly turned end 11 of the base where it is fastened to a ring.

The operation of this trap will be obvious. The bait is to be attached to the wire 29 when the parts are in the position shown in Figure 1 and the pull of the animal endeavoring to loosen the bait will release the latch 25 from its engagement with the trigger whereupon the spring will cause the closing of the jaws. It will be seen that I have entirely eliminated the ordinary trip trigger used on a common steel trap and in its place I have provided a wire trip to which the bait is to be attached. It will also be seen that the main spring of my trap is of entirely different construction than the main spring of ordinary steel traps inasmuch as it is expanded apart when the jaws are open instead of being compressed as is the case with the ordinary steel trap. It will be seen that with this construction the bait may be attached to the trap at any desired point along the wire 29 and that a pull upon this wire at any point will cause the release of the trap.

I claim:—

A trap of the character described including a base, opposed jaws pivoted upon the base, bracket members extending from the jaws in spaced relation to each other and a partially elliptical spring engaged at its ends with said bracket members and urged to a contracted position to thereby close the jaws, a trigger pivoted upon one of said bracket members, passing through the other bracket member and having a notch, a latch mounted upon the last named bracket member and resiliently urged into engagement with the notch, a flexible cord attached to the rear end of the latch, a pulley over which the cord passes, the cord extending through the trap above the base thereof, and having means whereby the bait may be attached thereto.

In testimony whereof I hereunto affix my signature.

ANDRO NYLUND.